United States Patent [19]

Ischenko et al.

[11] 4,128,197

[45] Dec. 5, 1978

[54] DEVICE FOR REMOVING FLASH FROM MOULDED RUBBER ARTICLES

[76] Inventors: Vitaly G. Ischenko, bulvar Profsojuzov, 26, kv. 193; Vladimir A. Shvetsov, ulitsa Gorkogo, 12, kv. 13; Evgeny N. Erygin, Prospekt Lenina, 93, kv. 53, all of Volzhsky Volgogradskoi oblasti; Roman L. Girshik, Sokolnichesky val, 24, korpus 2, kv. 139, Moscow, all of U.S.S.R.

[21] Appl. No.: 843,820

[22] Filed: Oct. 20, 1977

[51] Int. Cl.² .......................... B26F 3/00; B29H 3/06
[52] U.S. Cl. ........................................ 225/97; 225/93; 225/93.5; 425/806
[58] Field of Search .......................... 225/97, 93.5, 93; 51/164; 425/806 R

[56] References Cited

U.S. PATENT DOCUMENTS

| 2,342,443 | 2/1944 | Wood | 425/806 R X |
| 3,767,096 | 10/1973 | Coscia | 225/97 |

FOREIGN PATENT DOCUMENTS

| 523806 | 10/1976 | U.S.S.R. | 425/806 |
| 523807 | 10/1976 | U.S.S.R. | 425/806 |

*Primary Examiner*—Frank T. Yost
*Attorney, Agent, or Firm*—Lackenbach, Lilling & Siegel

[57] ABSTRACT

The present invention is a tool used for removing the cooled flash from rubber articles and is constituted by conventional brushes arranged rotatably across the movement of a belt. These brushes are mounted on shafts which are secured in rotatable discs arranged on both sides of the workpiece holding zone.

2 Claims, 3 Drawing Figures

DEVICE FOR REMOVING FLASH FROM MOULDED RUBBER ARTICLES

FIELD OF THE INVENTION

The present invention relates to processing of moulded rubber articles and, more specifically, it relates to removal of flash from moulded rubber articles.

The present invention can be utilized in all branches of industry where rubber articles are used, e.g. automotive, chemical, aviation industries, etc.

Moreover, the present invention can find application for removing flash from plastic and polymer articles.

DESCRIPTION OF THE PRIOR ART

At present, flash is removed with the aid of installations intended to process articles by a variety of methods. Particularly, a device is known wherein flash is removed from cooled moulded rubber articles with the aid of brushes. Such an installation comprises a working chamber in the form of two lobes interconnected along projections and placed into a heat-insulated casing. Electric-driven brushes rotate in the lower part of the chamber, the direction and speed of rotation of each brush being controlled independently of one another.

The brush drives are located at the face of the working chamber. The workpieces are thrown up by the rotating brushes, strike one of the projections and fall down on the brushes. The brush bristles can be arranged straight along the generating line, helically, or in a sinusoidal pattern. The length of the brush bristles must ensure contact of the bristle ends with the adjacent bristle ends and with the inside surface of the chamber. The loading and unloading openings are located, respectively, in the upper and lower parts of the chamber and are closed with special covers. The working chamber is cooled with liquid nitrogen or carbonic acid through a coil provided on its external surface.

However, the prior art device has a number of substantial disadvantages. For example, the heat exchange between the cooling medium and the workpieces takes place through the coil, whereby the workpiece is cooled slowly and the processing cycle is extended which causes a low output of the device.

Besides, stirring of the workpieces is insufficiently intensive since it is ensured only by the rotation of the brushes, and the working zone is too small which results in incomplete removal of flash and calls for reworking the articles. Another disadvantage of the prior art device lies in the necessity for the use of a cooling medium, nitrogen or carbonic acid, delivered into the coil (heat exchanger) which leads to losses on account of the heat exchange.

Another, more advanced method of removing flash from rubber articles consists in shot-blasting the frozen rubber articles. The device utilizing this principle comprises an endless perforated belt located in a heat-insulated casing, running around driving sprockets and forming a zone for holding the workpieces. The cooling medium enters the working chamber of the shot-blasting unit so that the workpieces fed into said chamber through the loading appliance are cooled directly in the flow of the cooling medium.

The endless belt is intended to stir the workpieces in the course of their cooling and shot-blasting, and to unload the finished articles from the working chamber. The cooled workpieces with frozen flash are bombarded by a shot-blasting gun which accelerates the stream of shot supplied from a metering appliance to the required speeds and directs it onto the articles being stirred on the belt.

A disadvantage of this prior art device lies in that the shot-blasting of the cooled articles impairs their luster, changes their size and makes them rough.

Moreover, this device is incapable of removing all the flash from the workpieces.

SUMMARY OF THE INVENTION

The main object of the invention resides in providing a device for removing flash by intensive machining in the workpiece holding zone.

Another object of the present invention resides in improving the quality of the flash-removing process.

Still another object of the present invention resides in ensuring the possibility of producing articles with a higher standard of surface finish.

And a further object of the present invention resides in increasing the output of the flash-removing device.

These and other objects are achieved by providing a device for removing flash from moulded rubber articles which comprises an endless perforated belt located in a heat-insulated casing, running around driving sprockets and forming a workpiece holding zone. A mechanical tool for machining the rubber articles is constituted by conventional brushes arranged rotatably across the movement of the belt and installed on shafts which are secured in rotatable discs arranged on both sides of the workpiece holding zone.

It is practicable that the brushes be made of a non-freezing elastic material.

Such a layout of the device allows the moulded rubber articles to be machined with a high surface finish.

BRIEF DESCRIPTION OF THE INVENTION

Now the invention will be described in detail by way of an example with reference to the accompanying drawings in which.

DETAILED DESCRIPTION OF THE INVENTION

Figure 1:
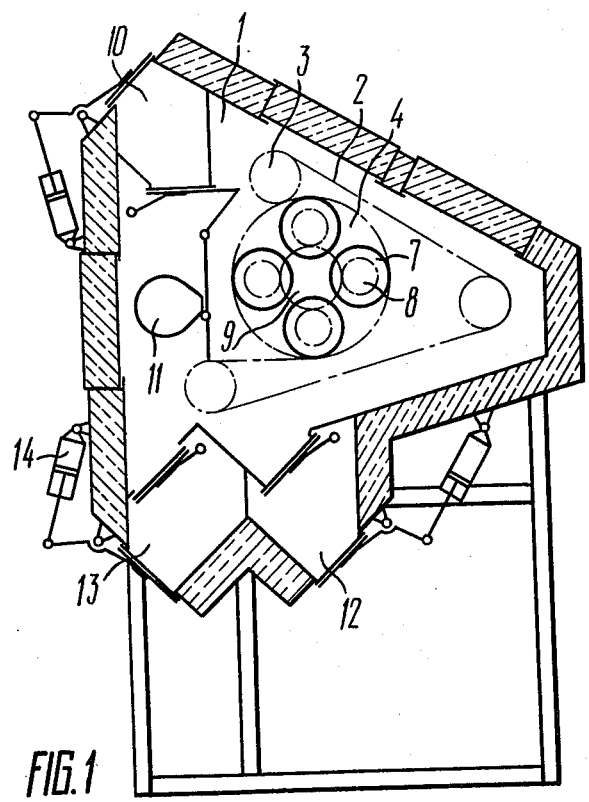
FIG. 1 is a longitudinal, section view of the device according to the invention.
Figure 3:
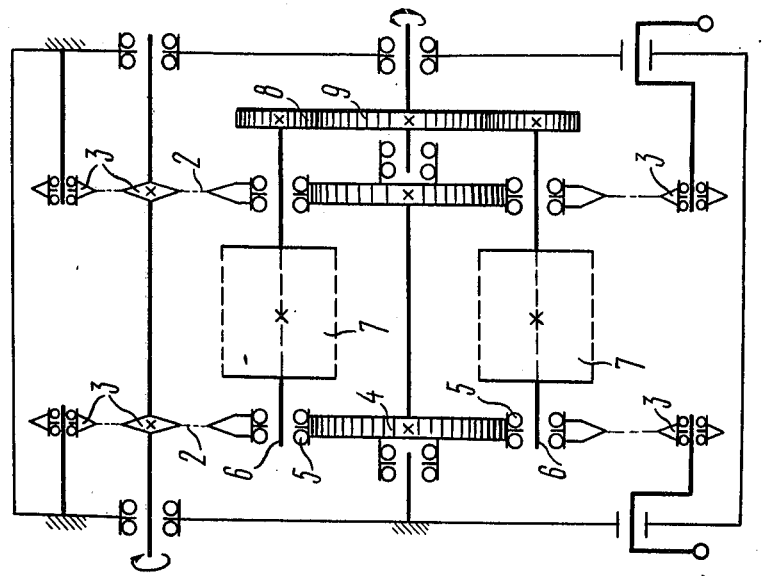
FIG. 3 is a kinematic diagram of the device according to the invention.
Figure 2:
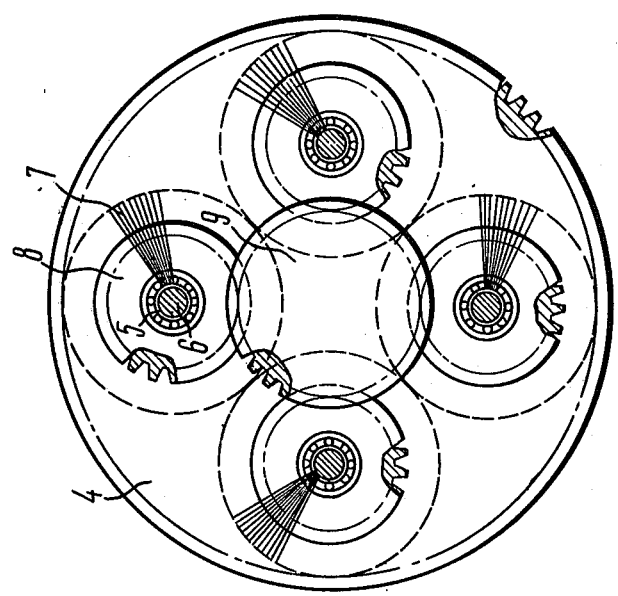
FIG. 2 is an enlarged operational diagram of the mechanical tool for removing flash.

The device (FIGS. 1, 2, 3) for removing flash comprises a pressure tight heat-insulated casing 1 accommodating an endless perforated belt 2 running around driving sprockets 3 and forming a workpiece holding zone.

Arranged on both sides of the workpiece holding zone are rotatable discs 4 defining said zone on the faces. Secured on bearing supports 5 in the discs 4 are shafts 6 carrying brushes 7 for removing flash from the workpieces.

The brushes 7 are installed across the movement of the endless belt 2 with a provision for rotating both around the axis of the belt 2 and around their own axis.

The brushes 7 are preferably made from a non-freezing elastic material and can therefore be used at low temperatures.

The output ends of the shafts 6 carry gears 8 meshing with the central sprocket 9 which transmits torque to the brushes 7 on the principle of a planetary mechanism.

The device functions as follows.

A batch of rubber articles is supplied into the casing 1 by a loading appliance 10 and onto the belt 2. Simultaneously, a cooling medium, atmospheric air, is fed into the casing 1 through a diffuser 11 to cool the articles being stirred on the belt 2. The time required for cooling the articles is found by calculations.

Being frozen, the flash becomes brittle and is swept off by the brushes 7 which perform compound motions around the axis of the belt 2 and around their own axes.

The articles are acted upon by the brushes 7 on one side and by the belt 2 on the other side which ensures efficient removal of flash. The brushes rotate around their axes at a speed of 500–1000 rpm. The action of the elastic brush hairs does not impair the appearance of the articles. The removed flash falls through perforations of the belt 2 into a hopper 12 and thence it is discharged from the casing 1. The finished articles are unloaded from the casing by an unloading appliance 13 by reversing the movement of the belt 2. Then the article is delivered for inspection and the working cycle is repeated over again.

The device according to the invention gives a considerable gain in output since the entire processing cycle of the articles lasts from 2 to 4 minutes.

The finished articles are characterized by efficient removal of flash and a high surface finish.

What is claimed is:

1. A device for removing flash from molded rubber articles comprising: a pressuretight heat-insulated casing; an endless perforated belt accommodated in said casing; driving sprockets around which said endless belt is driven; a workpiece holding zone defined by said belt running around said driving sprockets; brushes for mechanical removal of flash arranged rotatably across the movement of said belt; shafts on which said brushes are supported; rotatable discs arranged on both sides of said workpiece holding zone and on which said shafts are supported.

2. A device as claimed in claim 1 wherein the brushes are made of a non-freezing elastic material.

* * * * *